FIG. 7

INVENTORS
PAUL J. PONTECORVO
CHARLES N. GILLESPIE
DONALD W. SMITH
BY
ATTORNEY

July 5, 1960 P. J. PONTECORVO ET AL 2,944,112
TELEPHONY
Filed March 26, 1954 7 Sheets-Sheet 7

FIG. 8

INVENTORS
PAUL J. PONTECORVO
CHARLES N. GILLESPIE
DONALD W. SMITH
BY Elmer J. Gorn
ATTORNEY United States Patent Office
2,944,112
Patented July 5, 1960

2,944,112

TELEPHONY

Paul J. Pontecorvo, Cambridge, Charles N. Gillespie, Wayland, and Donald W. Smith, Waltham, Mass., assignors to Raytheon Company, a corporation of Delaware Filed Mar. 26, 1954, Ser. No. 418,862

5 Claims. (Cl. 179—15)

This invention relates to telephony, and particularly to methods and means for connecting subscribers' stations to a central exchange by the interpolation of radiant energy transmitting and receiving equipment.

The invention as herein illustrated utilizes for radio linking purposes a pair of transmitting-receiving antennas, each adapted for association with microwave duplexing structures, including cavities whose operating resonance controls SHF oscillations generated by associated elements coupled to the respective cavities and in turn individually controlled by the identifying characteristics of the transmitted signals. When so applied, the invention lends itself to the inclusion of automatic frequency control and cavity resonance stabilization in the transmitting segment of each waveguide assembly, and automatic scanning control (with attendant frequency control) in the receiving segments of each waveguide assembly; said controls being applicable to the repeller electrode circuits of the respective local oscillators, herein illustrated as being of the klystron type.

The invention is characterized by the use of signal amplifying means common to each of a pair of distinct channels between which the various subscriber telephone sets are apportioned, in conjunction with ringing signal detection means for automatically associating said common amplifying means with one or the other of said channels, in accordance with the condition prevailing at terminal points of the respective channels. As herein illustrated, this feature of the invention operates to switch the input and output circuits of the master ringing amplifier from the first channel to the second whenever the latter channel becomes activated by the transmission of a ringing signal; this procedure permitting selective control of ringing signals, but without interference with the simultaneous use of both channels for conversation.

Another feature of the invention is the modulation of the subscribers' transmitter signal output by voice signals from any subscriber's station; the modulation circuit including a diode bridge acting as a signal wave form clipper and serving as a common transmitting circuit, first for the signaling tone, and subsequently for the voice signals; the latter being directed through a hybrid transformer that is automatically switched into the clipper-modulator circuit of the transmitter whenever any subscriber's set is taken into use. A similar diode bridge clipper circuit is interposed between the central station voice signal transformer and the modulation circuit controlling the central station transmitter frequency; both such clipper circuits serving to prevent overmodulation of the system by high level transients such as may be caused by dial pulses.

These and other characteristics of the invention will be better understood upon reference to the following description of the embodiment of the invention illustrated in the accompanying drawings wherein.

Figure 1:
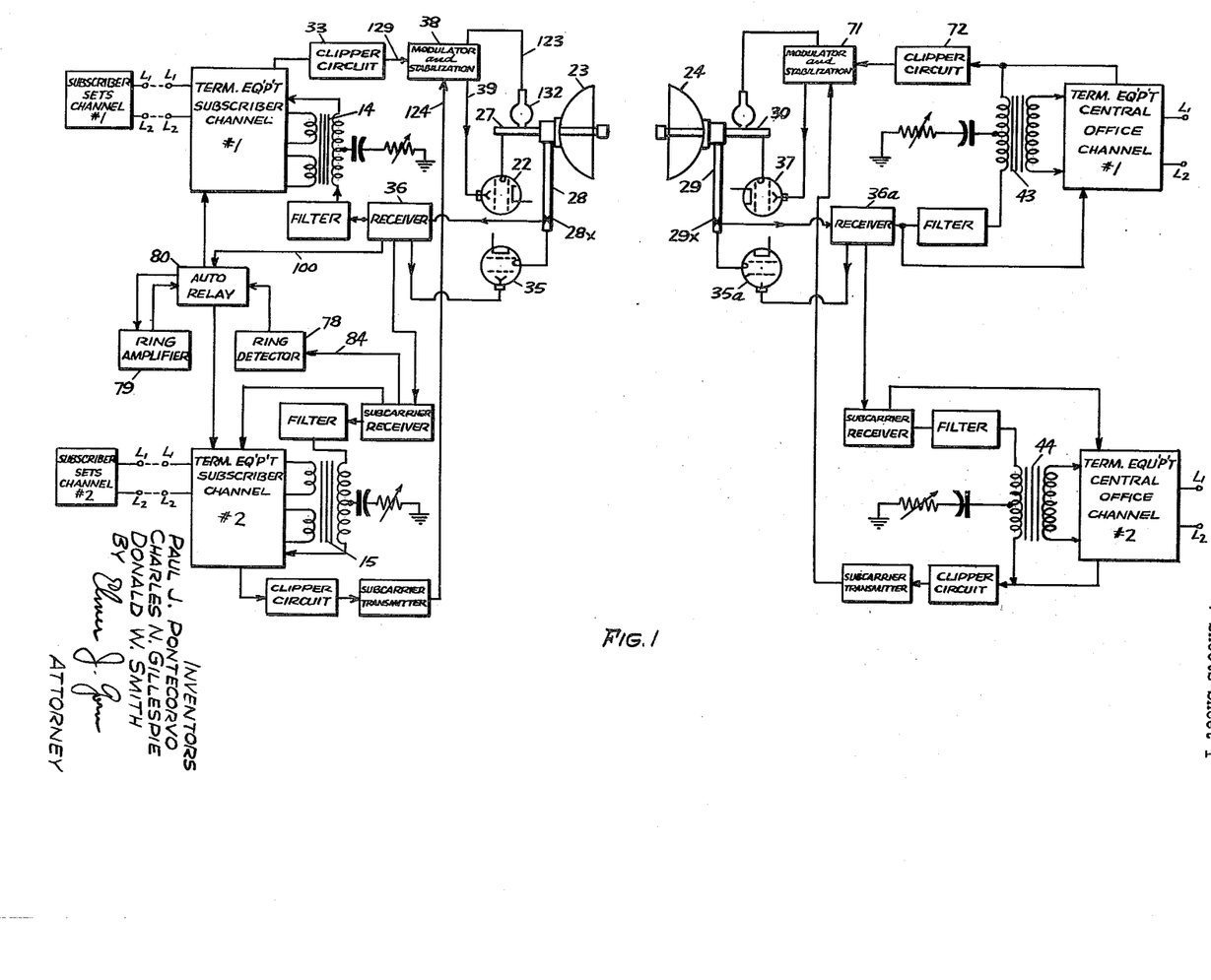
Fig. 1 is a schematic representation of a two-channel subscriber system radio-linked to a central exchange, and embodying the invention.
Figure 2:
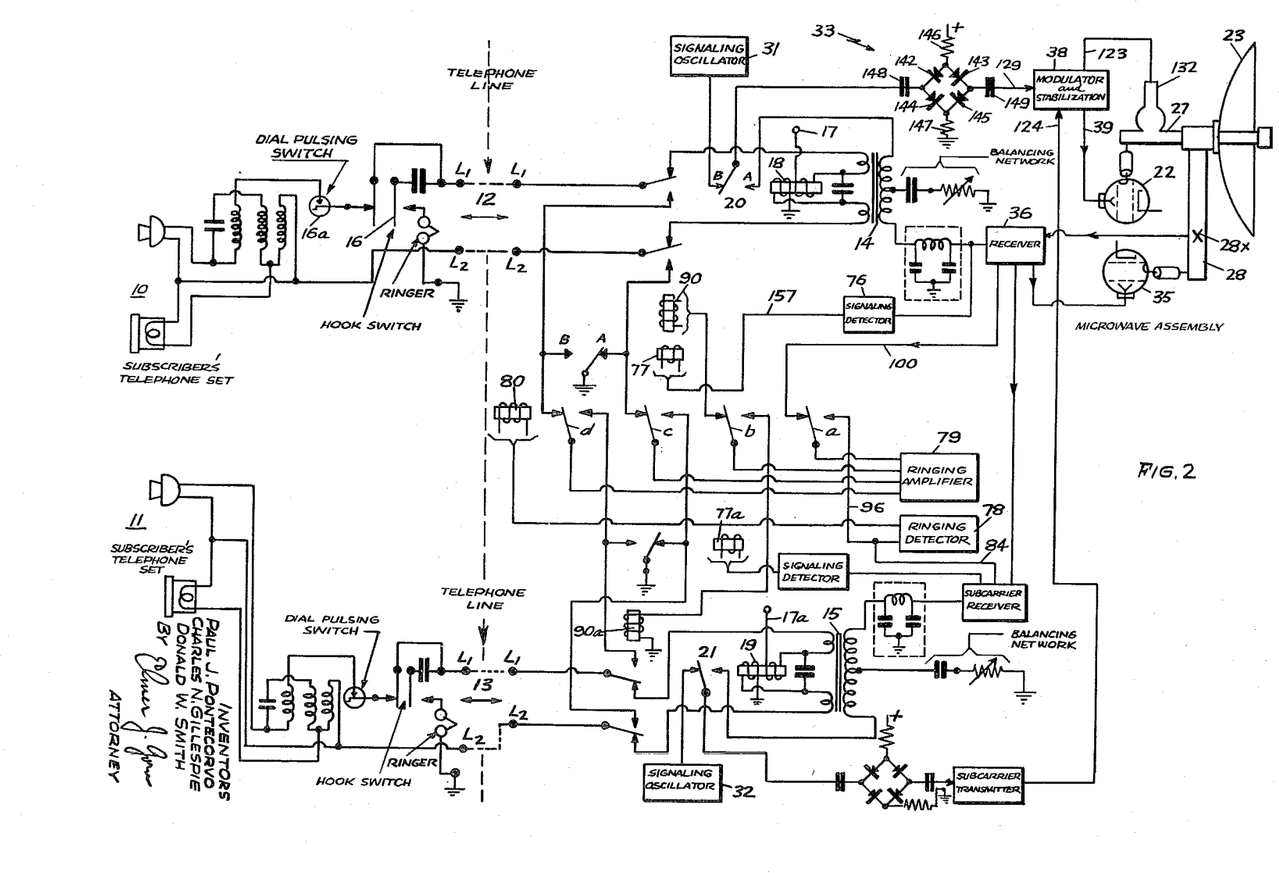
Figs. 2 and 3, considered together, show the Fig. 1 system in greater detail.

Referring first to Fig. 2, reference numerals 10 and 11 designate subscribers' telephone sets connected over lines 12 and 13, respectively, to their respective voice signal transformers 14 and 15 and their respective dial pulse relays 18 and 19 having associated contacts 20 and 21 controlling the alternate transmission of tone and voice signals to the transmitting klystron 22 associated with antenna assembly 23. A second antenna assembly 24 (Figs. 1 and 3) has a wave guide 29 to receive microwave energy of the proper polarity emanating from transmitting wave guide 27 of the antenna assembly 23, and a wave guide 30 to transmit microwave energy to be picked up by receiving wave guide 28 of the antenna assembly 23. Energy entering wave guide 29 beats with energy from klystron $35a$ in mixer crystal $29x$ to produce the intermediate frequency to be supplied to receiver circuitry $36a$.

Oscillations produced by klystron 37 are modulated by energy reaching stabilization unit 71 from one or the other of two signaling oscillators 41, 42 (see Fig. 3) or two voice signal transformers 43, 44, the latter being in circuit with line jack assemblies 47, 48, respectively, adapted to receive the plug connectors 49 of the operator's answering circuit (or the equivalent dial system connections) or the connectors 50 of the operator's calling circuit (or equivalent dial system connections), which circuits include the usual repeat coils, relays, lamps, and ringing key, as shown.

When fully selective ringing is required, conventional harmonic ringers are included in the subscribers' subsets, so that the ringer unit of only one subscriber on a multi-party line will be audible on any particular call. To permit additional selectivity by double use of each distinguishing frequency, one-half the total number of units on a given multiparty line may be subject to grounding on each call, and for this purpose group selector switch 63 (Fig. 3) is provided. In the position illustrated, switch 63 operates to ground those units that connect through line $L_1$. In the opposite position those units connected through line $L_2$ would be grounded.

The over-all operation can best be understood by tracing a signal from a subscriber station to the central office switchboard and back to the subscriber. Assuming a party line, subscriber on channel No. 1 lifts his telephone set from its hook, and the hook switch 16 is thrown into the position shown on the diagram. The D.C. circuit is now closed and current will flow from the −48 volt supply 17 through the subset 10, telephone line 12, transformer 14, and relay coils 18. (A similar result will ensue if dial pulsing switch $16a$ is actuated.) This current causes the dial pulse switch 20 to be pulled into position A which interrupts the 6.5 kc. signaling tone from signaling oscillator 31 and connects the output of the hybrid transformer 14 through the clipper circuit 33 to the modulator and stabilization unit 38. The klystron 22 is modulated by voice signals from the subscriber subset 10, which signals reach the repeller electrode circuit 39 by the path just traced.

Figure 3:
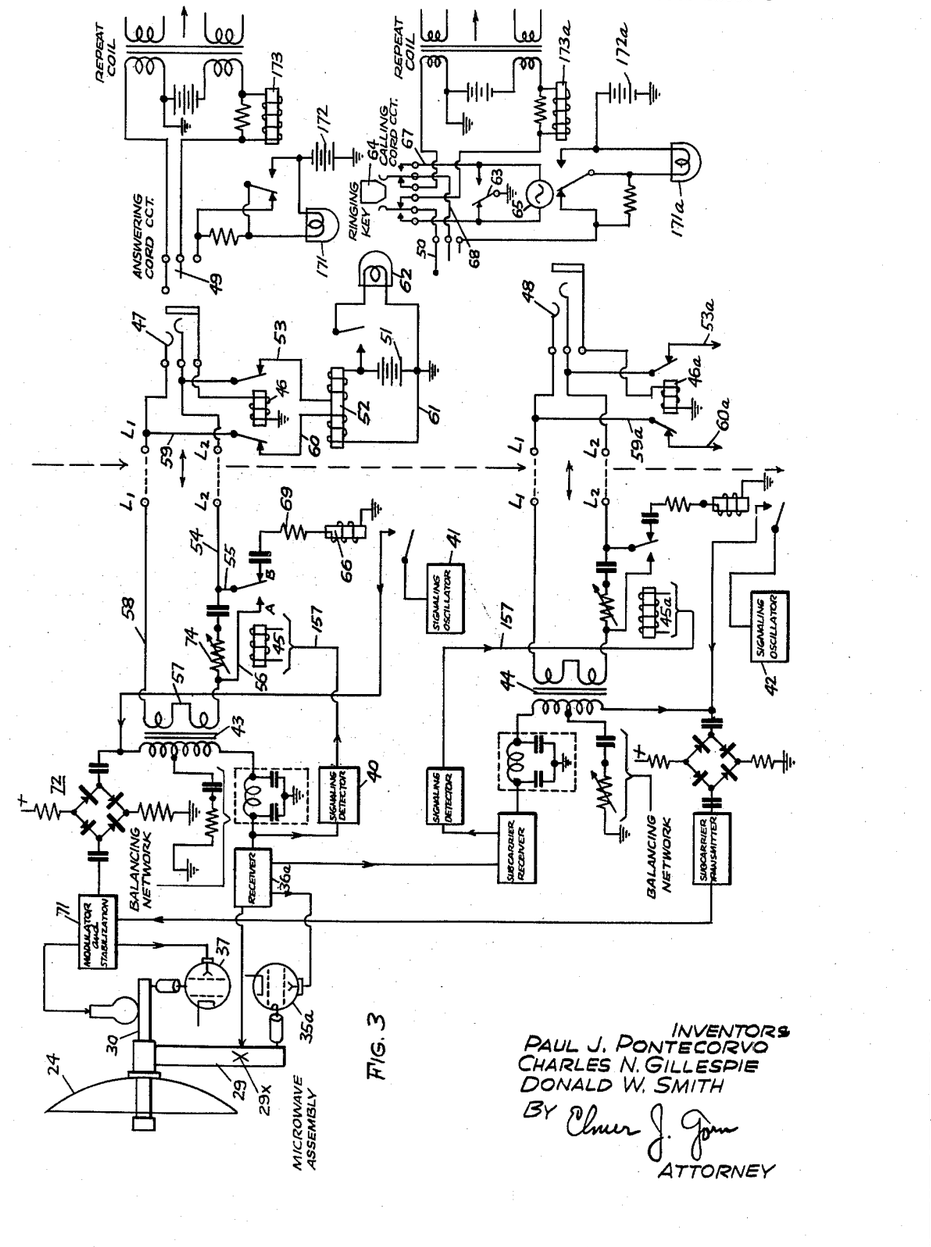

Absence of the normal 6.5 kc. signaling tone at the output of the central office terminal receiver 36a is detected by the signaling detector 40 which causes the central office dial pulse relay 45 to switch to position A. This completes a D.C. circuit from battery 51 to line relay 52 by way of conductors 53 to 61, inclusive. The resulting energization of relay 52 sends battery current into line lamp 62 to attract the operator's attention or, in the case of a dial exchange, to operate the dial mechanism. The operator may then plug in the operator's answering cord plug 49 to talk to the subscriber and handle the call in the usual manner. Inserting plug 49 sends battery current to relay 46 to reopen lines 53 and 60 and thus cut off relay 52 and lamp 62.

When a call originates from the central office to a channel 1, group 2 subscriber, the following sequence occurs. The operator's calling cord plug 50 is plugged into the channel 1 line jack 47; the group selector switch 63 is set to ground the $L_1$ side of the line as shown, and the ringing key 64 is depressed. This causes A.C. current to flow from source 65 through the ringing selector relay 66 by way of conductors 67, 68, 54, 55, and resistor 69. The resulting energization of relay 66 connects the 6.5 kc. signaling tone from the signaling oscillator 41 to the modulator and stabilization unit 71, by way of clipper circuit 72. The ringing voltage from the operator's calling cord circuit would simultaneously be fed to the modulator and stabilization unit 71 through the hybrid transformer 43, which is energized by reason of the simultaneous current flow through parallel grounded circuit 57—58—47—50—63. To permit adjusting the modulaton level for ringing, an adjustable resistor 74 is included in this parallel circuit.

The presence of a 6.5 kc. signaling tone at the output of the subscriber terminal receiver 36 is detected by the signaling detector 76 which causes the ringing selector relay 77 to switch to position B, thus grounding the $L_1$ side of the line. At the same time the ringing signal (having a frequency in the 16 to 66 c.p.s. range) is amplified by the ringing amplifier which energizes ringing relay 90, causing ringing voltage to be switched to the telephone line. Subscriber group 2 subsets (not shown) in which the ringer is connected between $L_2$ and ground will respond. Group 1 subsets (shown) will be unaffected. Assuming harmonic ringers to be employed, only the subsets of the proper frequency will ring.

If a group 1 subscriber is being called, switch 63 is shifted to ground the $L_2$ side of the line. The ringing selector relay 66 is not energized in this case. Absence of the 6.5 kc. signaling tone at the subscriber terminal causes relay 77 to remain in position A, thus grounding the $L_2$ side of the telephone line and allowing only group 1 subsets to ring.

If a call involves channel No. 2, the sequence is the same except that signaling and talking are done via the 6.5 kc. subcarrier which is also the transmitter stabilization reference signal. If a channel 2 subscriber lifts his subset 11, the operator at the central station in a similar manner notes a light on the channel 2 line lamp and connects the desired party to the channel 2 line. The conversation proceeds on the 6.5 kc. subcarrier via the subcarrier receivers and subcarrier transmitters. Ringing signals at the subcarrier receiver output cause ringing detector 78 to operate relay 80 which switches the input and output of the ringing amplifier 79 to channel 2. This automatic switching arrangement makes it possible to use a single ringing amplifier for both channels.

Figure 4:
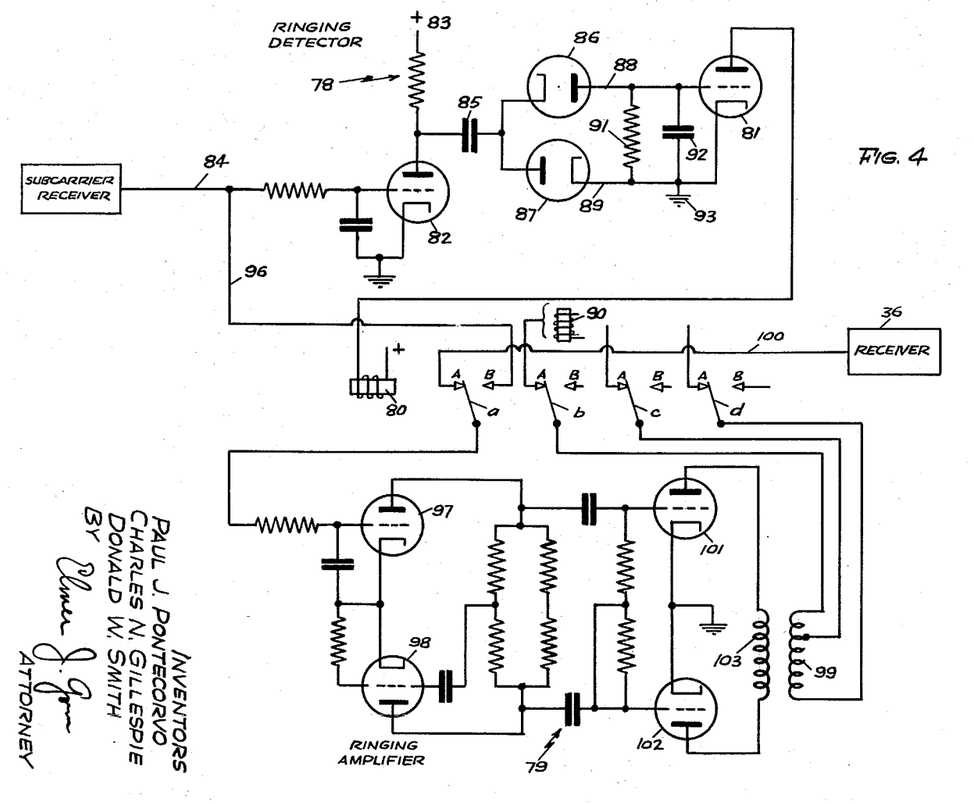
Fig. 4 shows the details of circuitry suitable for the automatic control of amplification of the ringing signals for the two subscriber channels illustrated in Fig. 1.

The details of the automatic switching circuit are illustrated in Fig. 4 wherein the control relay 80 is shown as including a winding having one of its terminals connected directly to the plate circuit of a triode 81 whose grid is normally biased at zero potential, so that full plate current flows through the relay winding. A second triode 82 has its plate electrode connected to a source 83 of positive potential, and its grid connected into the subcarrier receiver output line 84. The plate circuit of tube 82 connects to the grid of tube 81 by way of condenser 85, diodes 86 and 87, and lead 88 shunted by the R-C combination 91, 92. When a ringing signal voltage is impressed on line 84, it is amplified by tube 82. The amplified output of tube 82 is coupled to a voltage doubler circuit comprised of diodes 86 and 87, load resistor 91, and filter capacitor 92 by means of capacitor 85. The resulting negative D.C. potential cuts off tube 81, thereby interrupting current flow through relay 80.

The resultant interruption of operation of relay 80 shifts contacts 80a, b, c, and d to position B, thereby causing the ringing signal current to flow by way of lead 96 and contact 80a to the grids of amplifier tubes 97 and 98. Also, the output of transformer secondary 99, generated by the amplified signal output passing through the second amplifying stage constituted by tubes 101 and 102 and transformer primary 103, is switched to the ringing relay 90 and to the subscriber set of channel 2 by reason of the above-described shift of contacts 80b, 80c, and 80d to the channel 2 positions. It will be observed that this shift of the ringing voltage to channel 2 does not interfere with maintenance of voice signal voltage in channel 1; therefore, a subscriber on channel 1 may continue a conversation notwithstanding this shift of ringing current to channel 2.

When the subscriber on channel 2 lifts his receiver from the hook, in response to the ringing signal, there will be an interruption of the current flow in conductor 84 by reason of the cessation of the 16–66 c.p.s. ringing signal. This interruption of current flow energizes relay 80, allowing contacts 80a, b, c, and d to return to position A. Ringing may now occur in channel 1, if any channel 1 subscriber is being called, by way of channel 1 input line 100, leading directly to contacts 80a, as shown in Fig. 4.

By reason of the automatic relay switching just described, the single amplifier-transformer assembly illustrated in Fig. 4 serves as a common ringing source for both channels, thus saving the cost, weight and space that would otherwise be required if each channel had its own amplifier-transformer combination for control of ringing signals.

Figure 7:
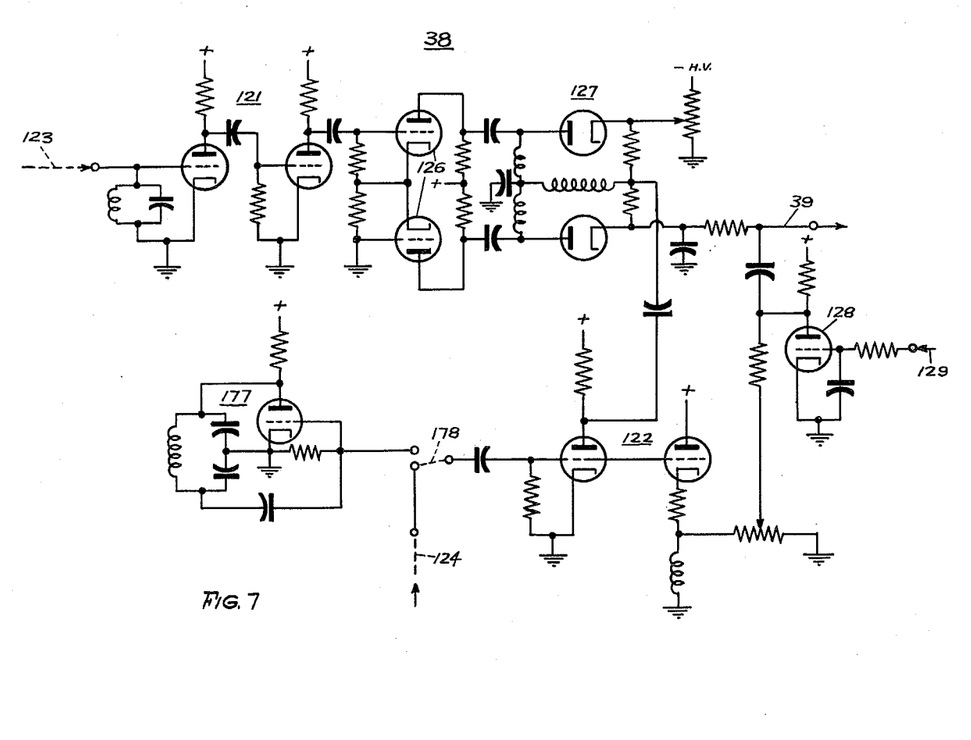
Fig. 7 shows details of stabilization circuits applicable to the transmitters illustrated in Fig. 1.

Fig. 7 shows the circuitry for the stabilization of transmitter frequency for one microwave assembly; it being understood that the circuitry may be duplicated for each of the microwave assemblies. As illustrated in Fig. 7, the circuitry of unit 38 includes two amplifier components 121 and 122 receiving signal input from conductors 123 and 124, respectively, a phase inverter component 126, a phase detector component 127, and a modulator component 128 receiving audio signal input from the adjacent telephone call sending line 129; the line 123 serving to supply amplifier 121 with a signal voltage amplitude modulated in accordance with the resonant frequency prevailing at the output terminal of the reference cavity 132. Any deviation in klystron output frequency will affect the voltage ratio established by the combined action of components 127 and 122, and will cause phase comparator 127 to vary the voltage supplied to the repeller electrode by way of lead 39, and this will cause the klystron frequency to shift toward the fixed resonant frequency of the reference cavity.

Thus, the klystron output frequency is held closely centered upon the resonant frequency of the transmitter reference cavity 132.

The call sending lines leading to the stabilization units 38, 71 are shown as including bridge networks 33 and 72 each consisting of four diodes 142, 143, 144, and 145 supplied at one midpoint by a current source with the opposite midpoint grounded; the operating voltages of the four component diodes being controlled by resistors 146 and 147, and blocking capacitors 148 and 149 distributed as shown in Figs. 2 and 3. These bridges serve to suppress dial pulse or other transient deviations from the basic wave amplitude, in wave clipping fashion, and thereby maintain voice transmission efficiency by preventing overmodulation of the transmitter circuit.

Figure 5:
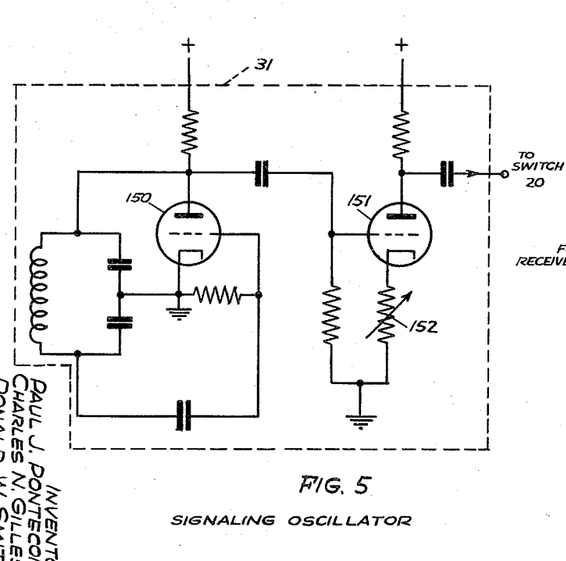
Fig. 5 shows the details of the circuitry for one of the signaling oscillators of Fig. 1.
Figure 6:
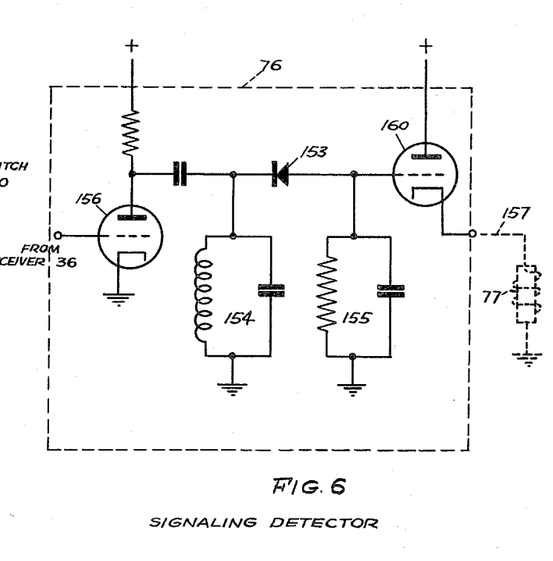
Fig. 6 shows the details of the circuitry for one of the signaling detectors of Fig. 1.

The signaling oscillator circuitry, as illustrated in Fig. 5, is significant in its use of a single triode amplifier 151 with adjustable resistance 152 in its cathode circuit for control of the output. A resistor across the grid circuit of tube 150 serves to regulate the oscillating voltage input at the grid. The signaling detector circuitry, as illustrated in Fig. 6, is significant in its use of a single rectifier 153 between two filter units 154 and 155 to convert the output of amplifier 156 to a D.C. signal in the grid circuit of tube 160. An input signal of frequency 6.5 kc. is amplified by tube 156 and passes through filter 154, rectifier 153, and filter 155 to apply a negative potential to the grid of tube 160, which interrupts the current flow through relay 77 via lead 157, thus performing the detection function.

Figure 8:
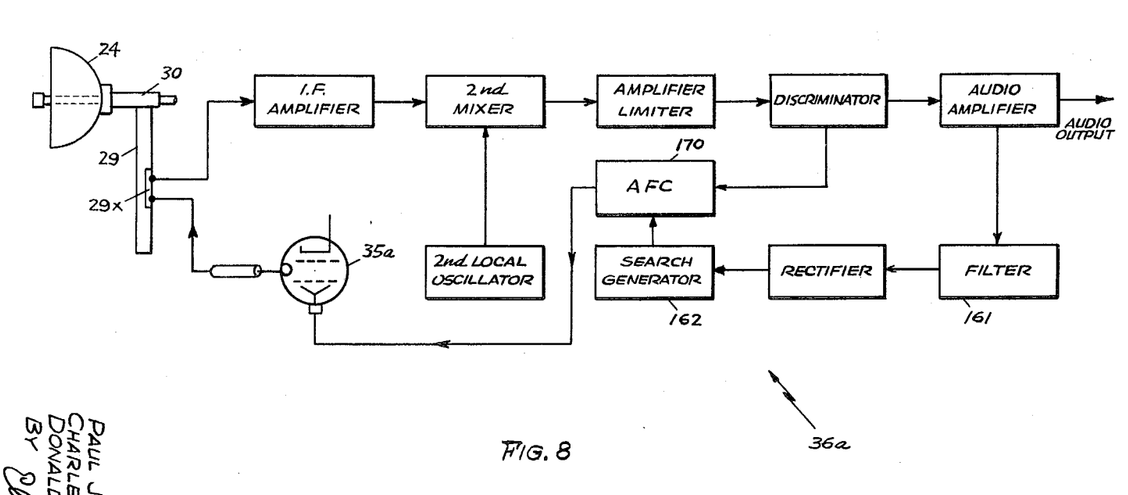
Fig. 8 is a block diagram of components of an automatic scanning control mechanism applicable to the receivers illustrated in Fig. 1.

Fig. 8 shows in block form the circuitry for automatic control of the operation of the klystron oscillators 35 and 35a controlling the energy input to receivers 36 and 36a, respectively. This automatic control is the subject of claims in United States patent application, Serial No. 416,063 filed by Geoffrey B. Parkinson, and is characterized by its utilization of a change in noise level as the control medium for governing the duration of the spectrum scanning function of the oscillator, as it seeks to detect the presence of the desired carrier frequency in the energy input to the wave guide 28, or the wave guide 29, as the case may be. To this end, the circuitry of Fig. 8 takes advantage of the known propensity of frequency modulated radiant energy to rid itself of its noise background once the carrier signal strength develops beyond the "threshold" value.

This propensity—sometimes referred to as "the quieting effect" characteristic of F.M. systems—is utilized in the present invention by (a) interposing a band pass filter 161 between the demodulated intermediate frequency output and the spectrum search wave generator 162, and (b) converting a component of the filtered noise to unidirectional current of positive potential. This positive D.C. voltage overcomes the normal negative bias on the search generator, causing it to activate the high frequency oscillator 35a (or 35) which thereupon begins the spectrum scanning operation. Searching continues until stopped by the noise level reduction which accompanies reception of a carrier signal.

The band pass filter 161 above referred to is tuned to a frequency within the I.F. band width, but has its own band width confined to a narrow range outside the modulated signal range and therefore is adapted to receive and pass components of noise but to remain unaffected by the presence of signals, or even to the presence of signal harmonics. On the other hand, the noise input to the filter will drop to a negligible level as soon as carrier wave energy is tuned in and the resultant loss of positive D.C. voltage supply to the grid of the search generator causes the generator to resume its normal inactive status, whereupon scanning ceases.

When the scanning ceases, the klystron 35a continues to oscillate, but at a controlled frequency that is held closely to a value that is different from the incoming signal frequency by the magnitude of the I.F. frequency. The A.F.C. network 170 for maintaining such frequency control, by control of the repeller voltage, is a component part of the circuitry represented in block form in Fig. 8, and is the subject of claims in the Parkinson patent application above identified.

It is to be understood that crystal mixer 28x corresponds in function to the described mixer 29x; also that parts designated in the drawings by numerals suffixed with the letter "a" correspond to described parts bearing like numerals, such as 17, 45, 77, 90, etc.; also, that parts represented only by legend-bearing blocks correspond to described parts bearing like legends, or to conventional parts describable by the terms constituting such legends.

In Fig. 3 conductors 60a and 53a lead to parts (not shown) corresponding to those connecting with leads 60 and 53, respectively; also in Fig. 3 numerals 171 and 171a designate supervising station lamps operated by batteries 172 and 172a, respectively, in response to energization of supervising relays 173 and 173a in the usual manner.

In Fig. 7 switch 178 may be thrown to the upper position to connect oscillating circuit 177 to amplifier 122, in lieu of the connection 124 leading back to the channel 2 oscillator 32 (see Fig. 2) if it is desired to have the system operate with only channel 1 functioning, or in case there is no second channel.

This invention is not limited to the particular details of construction, materials and processes described, as many equivalents will suggest themselves to those skilled in the art. It is, accordingly, desired that the appended claims be given a broad interpretation commensurate with the scope of the invention within the art.

What is claimed is:

1. In a two-channel telephone system, a local station comprising apparatus for receiving incoming signals, first and second receivers connected to said apparatus, said first receiver accepting calls on the first channel and said second receiver accepting calls on the second channel, a ringing amplifier, a relay having a control winding, a switch actuated by said relay connected to said amplifier for selectively coupling the input and output thereof to each of said channels, and means coupling the control winding of said relay to the output of one of said receivers for controlling the actuation of said switch.

2. In a two-channel telephone system, a local station comprising a first receiver for accepting calls on the first channel, a second receiver for accepting calls on the second channel, said receivers being coupled to a common means for receiving incoming signals, a ringing amplifier, a relay, a switch actuated by said relay connected to said ringing amplifier for selectively coupling the input and output thereof to each of said two channels, a ringing detector connected to the output of said second receiver, means coupling the output of said ringing detector to the relay of said selector switch.

3. In a two-channel telephone system, a station comprising a first receiver for accepting calls on the first channel, a second receiver for accepting incoming calls on the second channel, said receivers being coupled to a common means for receiving incoming signals, each of said receivers having its output coupled to a signaling detector, a relay coupled to said signaling detector and adapted to be energized thereby, a selector switch actuated by said relay for selectively connecting to ground each of a pair of telephone lines, a ringing amplifier, a relay, a selector switch actuated by said relay connected to said ringing amplifier for selectively coupling the input and output thereof to each of said two channels, a ringing detector coupled to the output of said second receiver, and means coupling the output of said ringing detector to the relay of said selector switch.

4. In a two-channel telephone system in which incoming calls at a local station are accepted by one of two separate receivers, each of said receivers being connected in a different channel of the two-channel system, a ringing amplifier, a relay, a selector switch actuated by said relay connected to said amplifier selectively coupling the input and output thereof to each of said channels, means coupling the output of one of said receivers to the relay of said switch to control its actuation, signal reception apparatus common to said receivers, said apparatus including means for converting received high-frequency signals into intermediate frequency signals, a microwave transmitter at a central exchange, a modulator connected to said transmitter, a pair of oscillators, each of said oscillators generating a fixed frequency different from the frequency of the other oscillator, switching means for selectively connecting each of said oscillators to said modulator, and selector means at said central exchange for actuating the last-named switching means.

5. A two-channel telephone system comprising a central exchange having means for transmitting and receiving microwaves, a microwave generator coupled to said means, a modulator coupled to and controlling said generator, a first oscillator for generating a fixed frequency, a second oscillator generating a fixed frequency different from the frequency of said first oscillator, selector means at said exchange for coupling one or the other of said oscillators to said modulator, a local station having apparatus for transmitting and receiving microwaves, a first receiver coupled to said apparatus for accepting incoming calls on the first channel, a second receiver coupled to said apparatus for accepting incoming calls on the second channel, a pair of signaling detectors, a first relay having a control winding, a switch actuated by said first relay, each of said detectors having its output coupled to the said control winding whereby said switch may be energized in response to signals from said detectors, said switch selectively connecting to ground each of a pair of telephone lines in response to the output of its associated signaling detector, a ringing amplifier, a second relay having a control winding, a selector switch connected to said ringing amplifier for selectively coupling the input and output thereof to each of said two channels, a ringing detector coupled to the output of said second receiver, and means coupling the output of said ringing detector to the relay winding of said selector switch.

References Cited in the file of this patent

UNITED STATES PATENTS

| | | |
|---|---|---|
| Re. 23,418 | Ransom | Oct. 16, 1951 |
| 1,603,657 | Wolfe | Oct. 19, 1926 |
| 2,299,487 | Moore | Oct. 20, 1942 |
| 2,490,007 | Peters | Nov. 29, 1949 |
| 2,542,592 | Styren | Feb. 20, 1951 |
| 2,599,097 | Entz et al. | June 3, 1952 |
| 2,672,589 | McLeod | Mar. 16, 1954 |
| 2,673,332 | Hathaway | Mar. 23, 1954 |
| 2,690,538 | Norton | Sept. 28, 1954 |
| 2,794,860 | Scholten et al. | July 4, 1957 |